(12) United States Patent
Witchey

(10) Patent No.: US 12,344,192 B2
(45) Date of Patent: Jul. 1, 2025

(54) WHEEL CLAMP

(71) Applicant: Bryan Witchey, Jupiter, FL (US)

(72) Inventor: Bryan Witchey, Jupiter, FL (US)

( * ) Notice: Subject to any disclaimer, the term of this patent is extended or adjusted under 35 U.S.C. 154(b) by 59 days.

(21) Appl. No.: 18/197,720

(22) Filed: May 16, 2023

(65) Prior Publication Data

US 2023/0407681 A1 Dec. 21, 2023

Related U.S. Application Data

(60) Provisional application No. 63/353,037, filed on Jun. 17, 2022.

(51) Int. Cl.
*B60R 25/09* (2013.01)

(52) U.S. Cl.
CPC ............ *B60R 25/09* (2013.01); *B60R 25/096* (2013.01)

(58) Field of Classification Search
CPC ...... B60R 25/09; B60R 25/093; B60R 25/096
See application file for complete search history.

(56) References Cited

U.S. PATENT DOCUMENTS

| | | | |
|---|---|---|---|
| 2,960,857 A * | 11/1960 | Winter | B60R 25/093 70/225 |
| 4,188,032 A | 2/1980 | Yanagiok | |
| 4,234,190 A | 11/1980 | Airhart | |
| 4,255,087 A | 3/1981 | Wackerle et al. | |
| 4,339,490 A | 7/1982 | Yoshioka et al. | |
| 4,671,842 A | 6/1987 | Prochaska et al. | |
| 4,696,459 A | 9/1987 | Woltron et al. | |
| 4,819,462 A * | 4/1989 | Apsell | B60R 25/093 70/226 |
| 4,854,144 A * | 8/1989 | Davis | B60R 25/093 70/226 |
| 5,315,848 A * | 5/1994 | Beyer | B60R 25/093 70/237 |
| 5,375,442 A * | 12/1994 | Hammer | B60R 25/093 70/226 |
| 5,534,318 A | 7/1996 | Andre De La Porte et al. | |
| 5,601,493 A | 2/1997 | Nakazono et al. | |
| 5,665,470 A | 9/1997 | Key et al. | |
| 6,173,590 B1 | 1/2001 | Witchey | |
| 6,519,983 B2 | 2/2003 | Witchey | |
| 6,539,757 B2 | 4/2003 | Witchey | |
| 6,553,797 B2 | 4/2003 | Witchey | |
| 6,698,256 B2 | 3/2004 | Witchey | |
| 6,705,135 B2 | 3/2004 | Witchey | |
| 6,797,331 B2 | 9/2004 | Singler et al. | |
| 6,990,838 B2 | 1/2006 | Witchey | |

(Continued)

*Primary Examiner* — Christopher J Boswell

(57) ABSTRACT

A wheel clamp having an outer hook; an inner hook; a plate member having a plate aperture; a lock mechanism, wherein the lock mechanism is at least partly surrounded by a housing; the outer hook comprises a first outer hook member, a second outer hook member, and a third outer hook member; a female receiving member receives a first end of the third outer hook member; the inner hook comprises a first inner hook member, a second inner hook member, and a third inner hook member; and the first inner hook member is perforated to provide an inner hole, the first outer hook member is perforated to provide a plurality of outer holes, wherein when the inner hole is aligned with one of the plurality of outer holes the lock mechanism is capable of engaging the inner hole with one of the plurality of outer holes.

15 Claims, 22 Drawing Sheets

(56) References Cited

U.S. PATENT DOCUMENTS

| | | |
|---|---|---|
| 7,083,199 B2 | 1/2006 | Graber et al. |
| 7,278,663 B2 | 10/2007 | Witchey |
| 7,337,636 B2 | 3/2008 | Witchey |
| 7,815,211 B2 | 10/2010 | Witchey |
| 8,376,426 B2 | 2/2013 | Choi et al. |
| 9,168,801 B2 | 10/2015 | Dicke et al. |
| 9,574,081 B2 | 2/2017 | Ishimoto et al. |
| 9,751,239 B2 | 9/2017 | Murai et al. |
| 9,963,105 B1 * | 5/2018 | Gordon .................. B60R 25/09 |
| 10,227,464 B2 | 3/2019 | Saji |
| 10,240,371 B2 | 3/2019 | Witchey |
| 10,272,873 B2 | 4/2019 | Witchey |
| 10,611,057 B2 | 4/2020 | Taketa et al. |
| 10,773,472 B2 | 9/2020 | Takano et al. |
| 11,208,911 B2 | 2/2021 | Sadler et al. |
| 11,192,280 B2 | 12/2021 | Ochi et al. |
| 11,198,651 B2 | 12/2021 | Sadler et al. |
| 11,198,924 B2 | 12/2021 | Chandrasekaran et al. |
| 11,203,178 B2 | 12/2021 | Kuroda |
| 11,208,535 B2 | 12/2021 | Ochi et al. |
| 11,220,465 B2 | 1/2022 | Kubo et al. |
| 2002/0104336 A1 | 8/2002 | Witchey |
| 2002/0104340 A1 | 8/2002 | Witchey |
| 2002/0104342 A1 | 8/2002 | Witchey |
| 2003/0167805 A1 | 9/2003 | Witchey |
| 2003/0167806 A1 | 9/2003 | Witchey |
| 2003/0167807 A1 | 9/2003 | Witchey |
| 2004/0200246 A1 | 10/2004 | Witchey |
| 2005/0099018 A1 | 5/2005 | Witchey |
| 2006/0220347 A1 | 10/2006 | Witchey |
| 2007/0228693 A1 | 10/2007 | Witchey |
| 2018/0010369 A1 | 1/2018 | Witchey |
| 2018/0194320 A1 | 7/2018 | Witchey |
| 2020/0070774 A1 * | 3/2020 | Sid .......................... B60R 25/09 |
| 2021/0213649 A1 | 7/2021 | Ochi et al. |
| 2022/0396239 A1 * | 12/2022 | Clarke .................. B60R 25/093 |

* cited by examiner

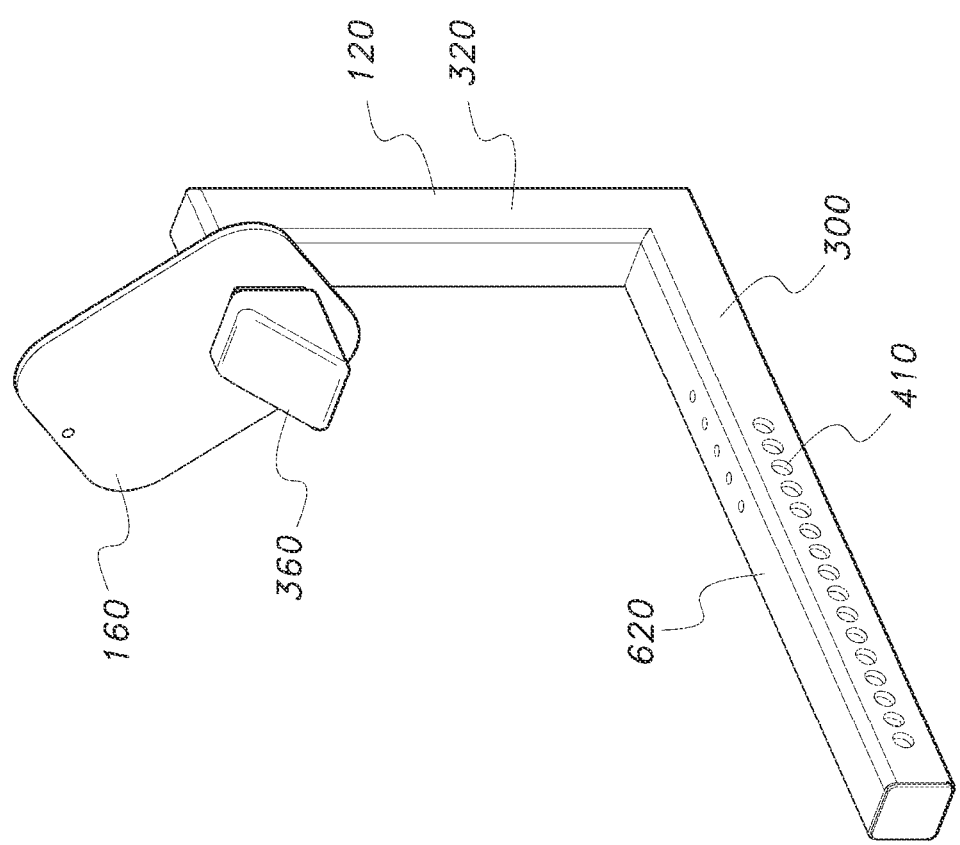

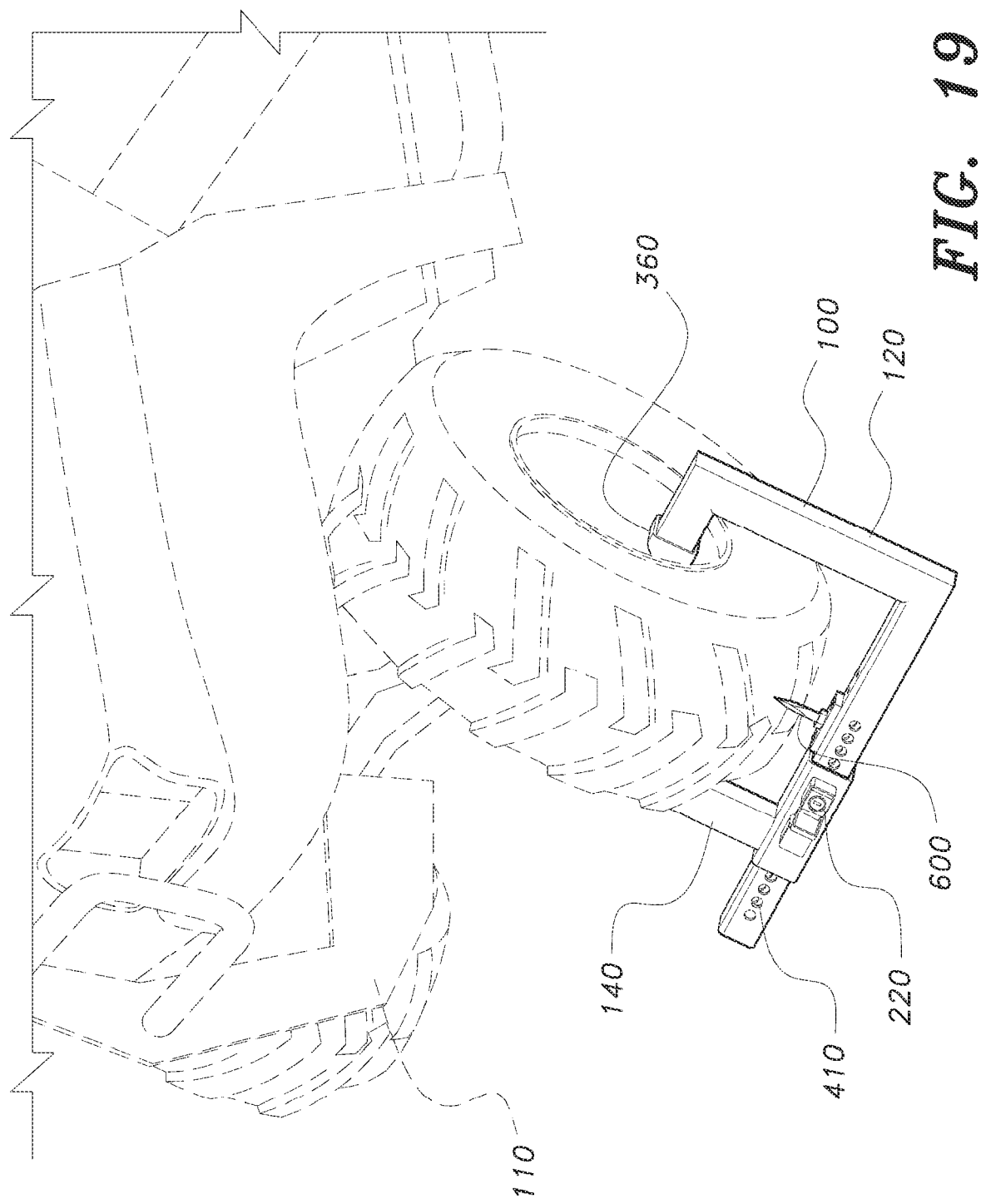

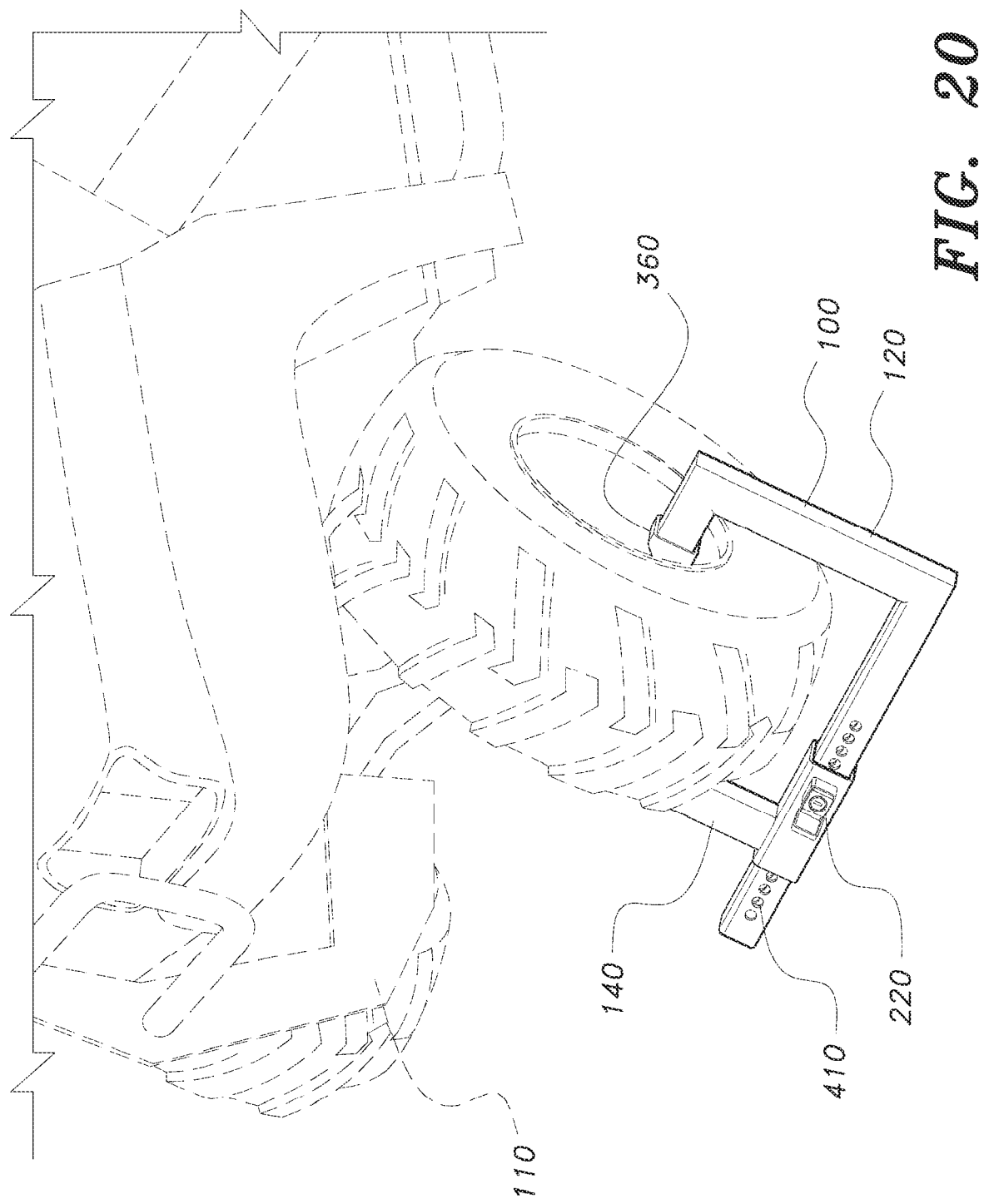

| TABLE 1 | |
|---|---|
| # | Description |
| 100 | a wheel clamp 100 |
| 110 | all-terrain vehicle (ATV); note: present invention is expressly not limited to ATVs and so can be fitted to a variety of vehicles wheels. |
| 120 | an outer hook 120 |
| 122 | a first hollow square cross-section 122 |
| 140 | an inner hook 140 |
| 142 | a second hollow square cross-section 142 |
| 160 | a plate member 160 |
| 180 | a plate aperture 180 |
| 200 | a female receiving member 200 |
| 220 | a lock mechanism 220 |
| 225 | lock cap 225 |
| 230 | barrel lock 230 |
| 235 | lock pin 235 |
| 240 | housing 240 |
| | |
| 300 | a first outer hook member 300 |
| 320 | a second outer hook member 320 |
| 325 | bottom end 325 of the second outer hook member 320 |
| 335 | a top end 335 of the second outer hook member 320 |
| 340 | a third outer hook member 340 |
| 350 | the third outer hook member 340 defines an angular shaped first end 350 |
| 360 | a first angular cap 360 fits over the angular shaped first end 350 |
| | |
| 400 | a first inner hook member 400 |
| 405 | an inner hole 405 in the first inner hook member 400 of the inner hook 140 |
| 410 | plurality of outer holes 410 in the first outer hook member 300 of the outer hook 120 |
| 415 | plurality of inner holes 415 in the first inner hook member 400 of the inner hook 140 |
| 420 | a second inner hook member 420 |
| 425 | bottom end 425 of the second inner hook member 420 |
| 435 | a top end 435 of the second inner hook member 420 |
| 440 | a third inner hook member 440 |
| 450 | the third inner hook member 440 defines an angular shaped second end 450 |
| 460 | a second angular cap 460 fits over the angular shaped second end 450 |
| | |
| 600 | nail like projection 600 |
| 620 | an inner side 620 of the first outer hook member 300 |
| 640 | an elongated extension member 640 |
| 660 | a tubular member 660 |
| 680 | an upper side 680 of the elongated extension member 640 |

*FIG. 21*

WHEEL CLAMP

CROSS-REFERENCE TO RELATED APPLICATIONS

This application claims the benefit of U.S. Application No. 63/353,037, filed Jun. 17, 2022, the content of which is incorporated herein by reference in its entirety.

STATEMENT REGARDING FEDERALLY SPONSORED RESEARCH OR DEVELOPMENT

Not Applicable.

FIELD OF THE INVENTION

The invention relates to a wheel clamp to be applied to the outer and inner faces of a wheel.

BACKGROUND

Wheel clamps are used, for example, to immobilize vehicles such as ATVs, campers, and pickup trucks, but none render the present invention invalid.

SUMMARY

In one non-limiting embodiment of the present invention, a wheel clamp comprises: an outer hook; an inner hook, a plate member, and a lock mechanism at least partly surrounded by a housing. The plate member defines a plate aperture therethrough. A female receiving member both surrounds and extends from the plate aperture. The outer hook comprises a first outer hook member, a second outer hook member, and a third outer hook member. The female receiving member receives a first end of the third outer hook member. The inner hook comprises a first inner hook member, a second inner hook member, and a third inner hook member; wherein an elongated extension member extends from the third inner hook member. The first inner hook member is perforated to provide an inner hole, the first outer hook member is perforated to provide a plurality of outer holes, wherein when the inner hole is aligned with one of the plurality of the outer holes the lock mechanism is capable of engaging the inner hole with one of the plurality of outer holes to prevent movement of the first outer hook member relative to the first inner hook member and thereby preventing movement of the outer hook relative to the inner hook.

BRIEF DESCRIPTION OF THE DRAWINGS

FIG. 17 shows a perspective view of an outer hook with a plate attached thereto according to the invention.

FIG. 19 shows a perspective environmental view of a wheel clamp according to the invention.

FIG. 20 shows a perspective environmental view of a wheel clamp according to the invention.

FIG. 21 is a table listing parts.

DETAILED DESCRIPTION OF THE INVENTION

It is to be understood that the terms "top" "bottom", "left", "right", "side", "front", "rear", "upper" "lower", "vertical", "horizontal", "height", "width", "length", "end" and the like are used herein merely to describe points of reference and do not limit the present invention to any specific orientation or configuration. It should also be understood that the claimed invention and parts may be of any size, shape or configuration suitable for operation of the invention and may be constructed of any suitable materials. Still further, any and all dimensions if shown in attached Figures are example dimensions; dimensions (length, width, height) can vary from those shown.

Figure 1:
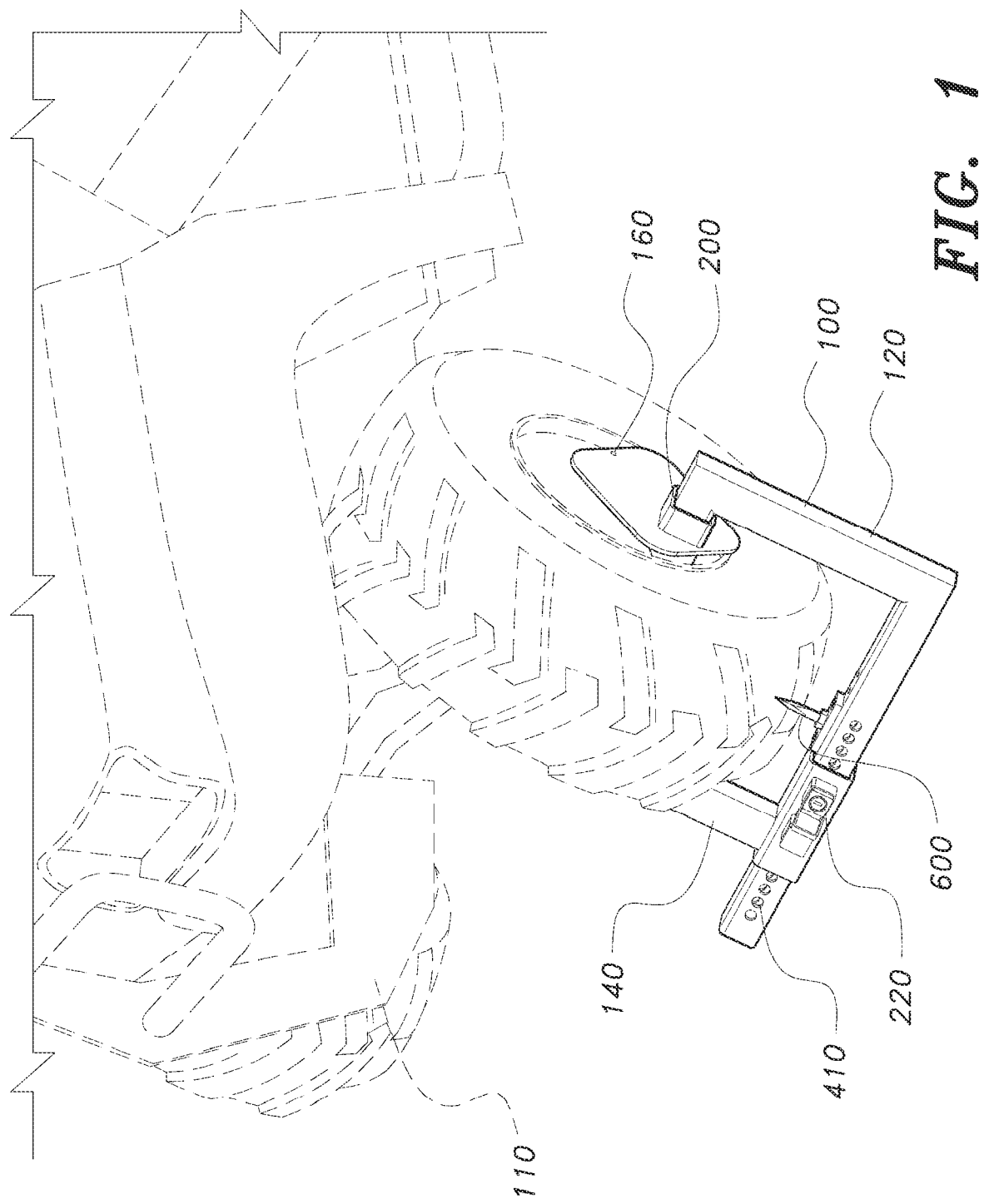
FIG. 1 shows a perspective environmental view of a wheel clamp according to the invention.

The wheel clamp 100 according to the present invention can be fitted, for example, to the driver's side front wheel (see, for example, FIG. 1) of a variety of vehicles which is to say the invention is not limited to a particular vehicle.

The wheel clamp 100 according to the invention is shown in the accompanying drawings clamped to an all-terrain vehicle (ATV) 110 (specifically, in FIGS. 1, 13, 19, and 20). However, it should be expressly understood that the wheel clamp 100 of the present invention can be used to clamp a variety of wheels and hence is expressly not limited to clamping an ATV's wheel.

Table 1 of parts (FIG. 21) is a useful point of reference with respect to the Figures.

Referring to the Figures in general, the wheel clamp 100 of the present invention comprises an outer hook 120, an inner hook 140, a plate member 160, and a lock mechanism 220 (the lock mechanism 220 is at least partly surrounded by a housing 240).

Figure 3:
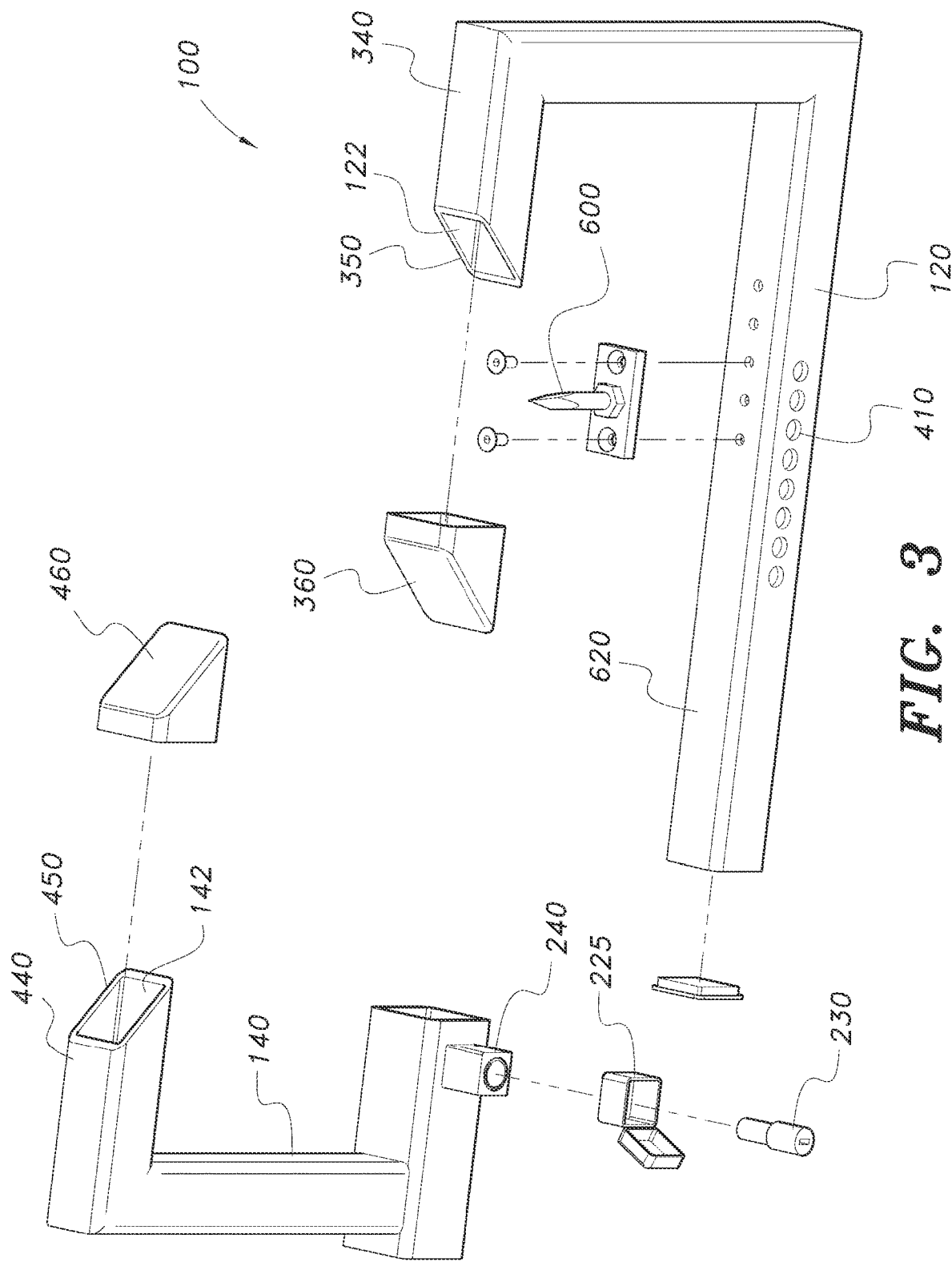
FIG. 3 shows an exploded view of a wheel clamp according to the invention.
Figure 4:
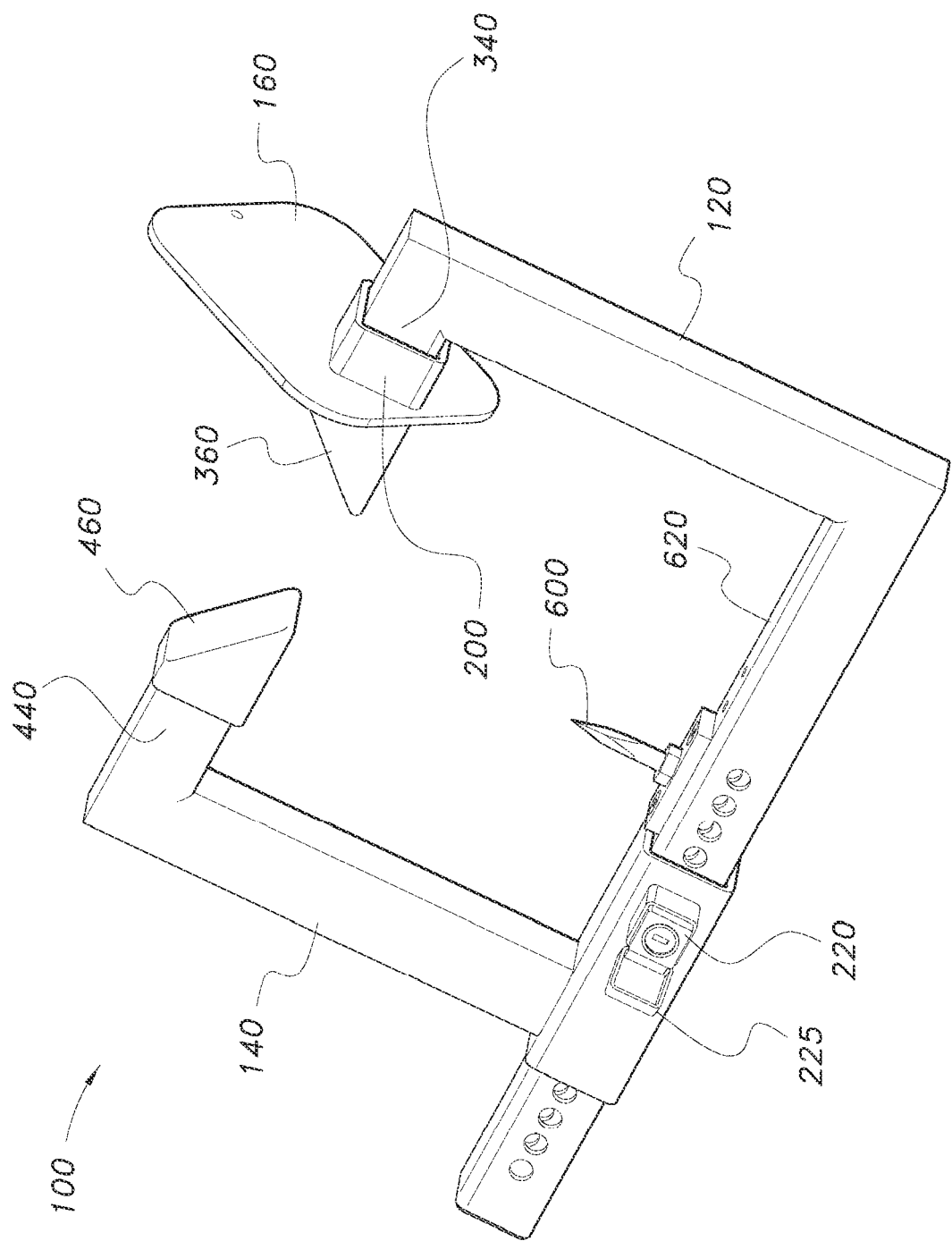
FIG. 4 shows a perspective view of a wheel clamp according to the invention.

The outer hook 120 comprises a first outer hook member 300, a second outer hook member 320 and a third outer hook member 340. The second outer hook member 320 is located between the first outer hook member 300 and the third outer hook member 340. The first outer hook member 300 is connected to a bottom end 325 of the second outer hook member 320. The third outer hook member 340 is connected to a top end 335 of the second outer hook member 320. The third outer hook member 340 defines an angular shaped first end 350. (See, for example, FIG. 3.) It should be understood that the first end 350 can adopt any suitable shape and hence is expressly not restricted to having an angular shape.

The inner hook 140 comprises a first inner hook member 400, a second inner hook member 420 and a third inner hook member 440. The second inner hook member 420 is located between the first inner hook member 400 and the third inner hook member 440. The first inner hook member 400 is connected to a bottom end 425 of the second inner hook member 420. The third inner hook member 440 is connected to a top end 435 of the second inner hook member 420. The third inner hook member 440 defines an angular shaped second end 450. It should be understood that the second end 450 can adopt any suitable shape and hence is expressly not restricted to having an angular shape. The second end 450 of the third inner hook member points inward toward the first end 350 of the third outer hook member 340.

Figure 6:
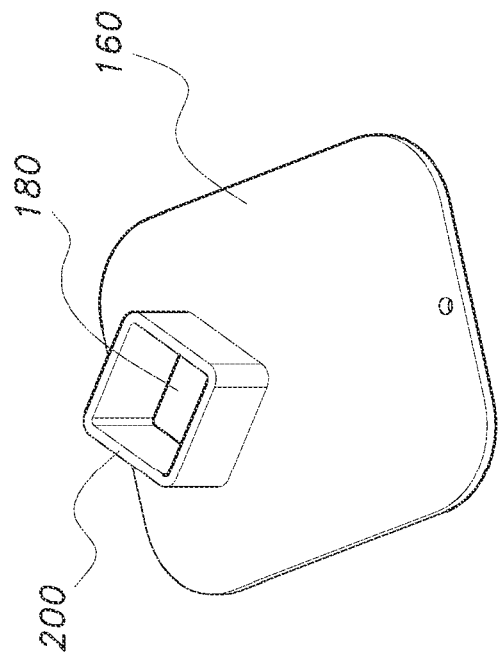
FIG. 6 shows an elevated view of a plate member according to the invention.
Figure 7:
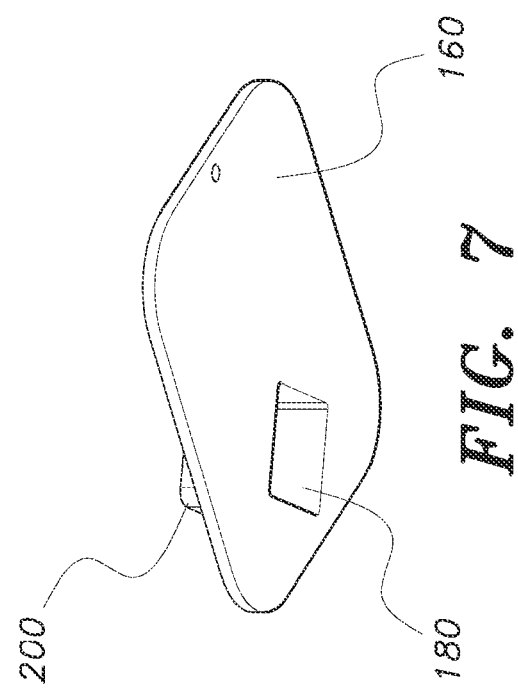
FIG. 7 shows a bottom view of the plate member shown in FIG. 6.
Figure 5:
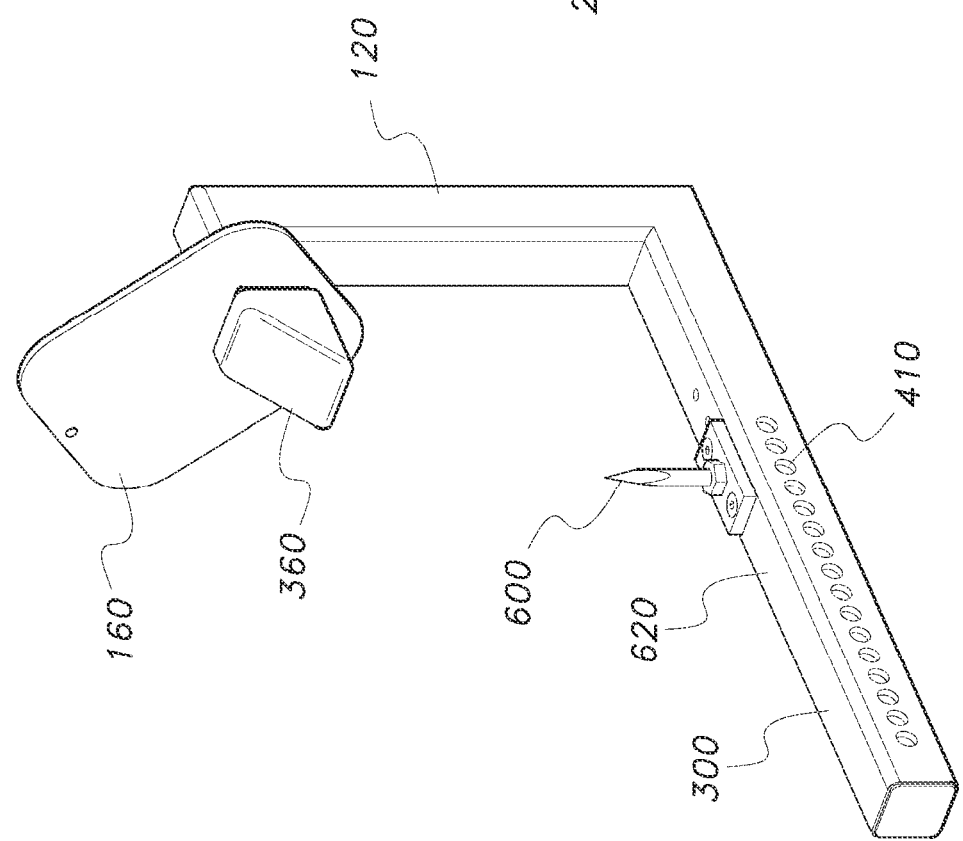
FIG. 5 shows a perspective view of an outer hook with a plate attached thereto according to the invention.

The plate member 160 comprises a plate aperture 180 therethrough. A female receiving member 200 both surrounds and extends from the plate aperture 180. (See, for example, FIGS. 6 and 7). Hence the plate member 160 comprises the plate aperture 180 and the female receiving member 200. The female receiving member 200 receives the first end 350 of the third outer hook member 340. In normal use of the wheel clamp 100, the plate member 160 covers one or more wheel lugs.

Figure 8A:
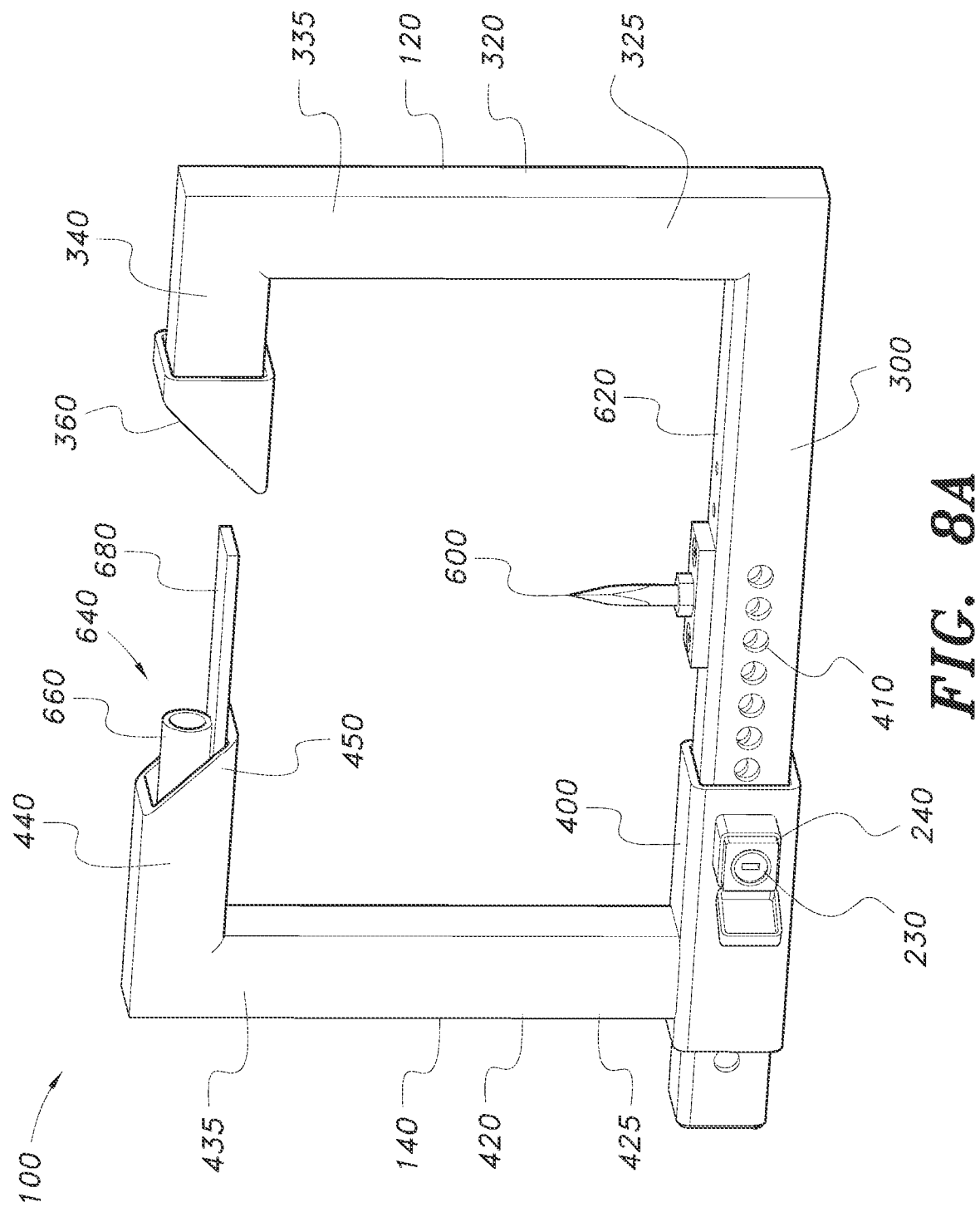
FIG. 8A shows a front view of a wheel clamp according to the invention.
Figure 8B:
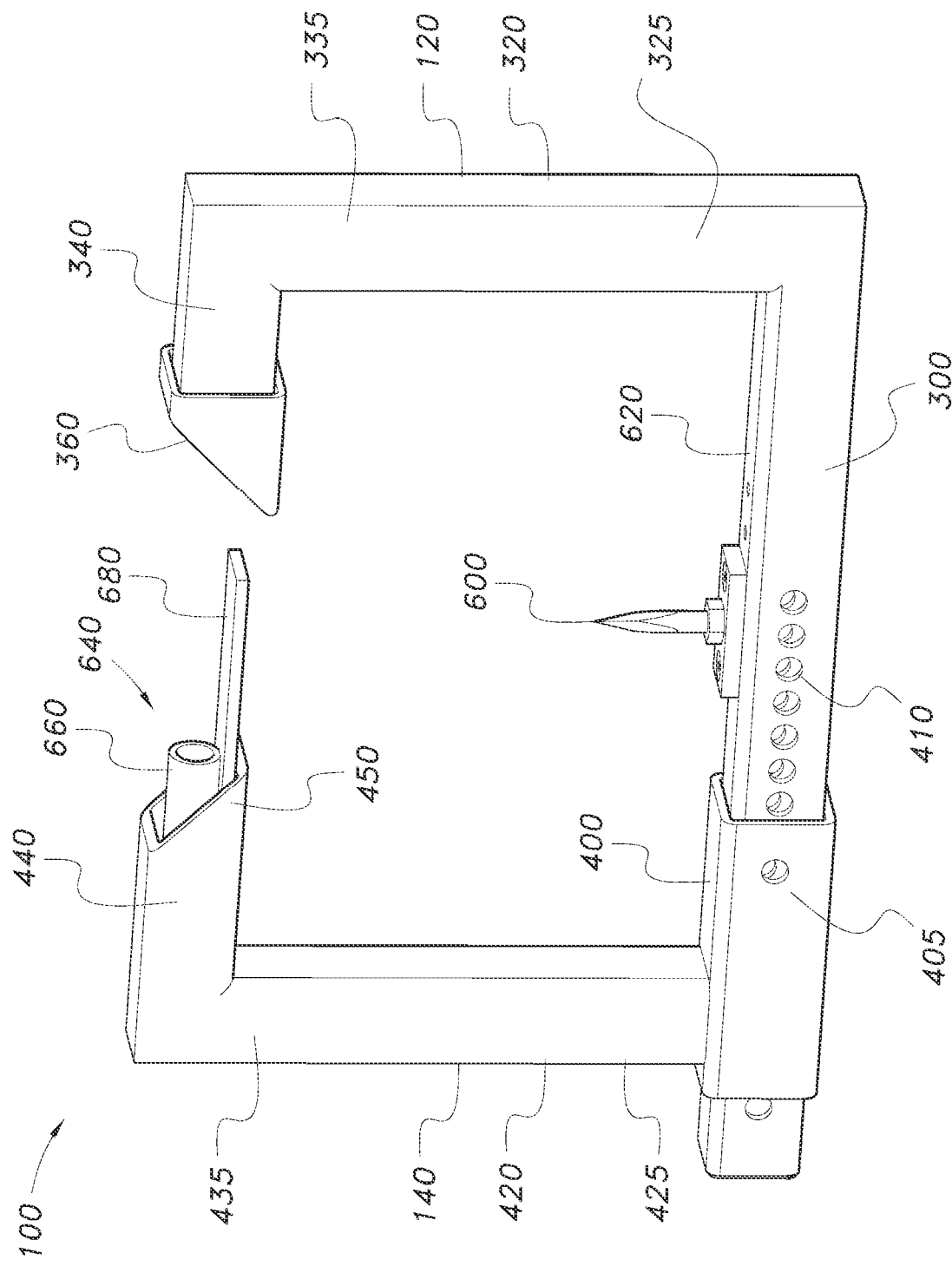
FIGS. 8B and 8C each show a front view (with the invention's lock mechanism and housing removed to show details there below) of a wheel clamp according to the invention.
Figure 11:
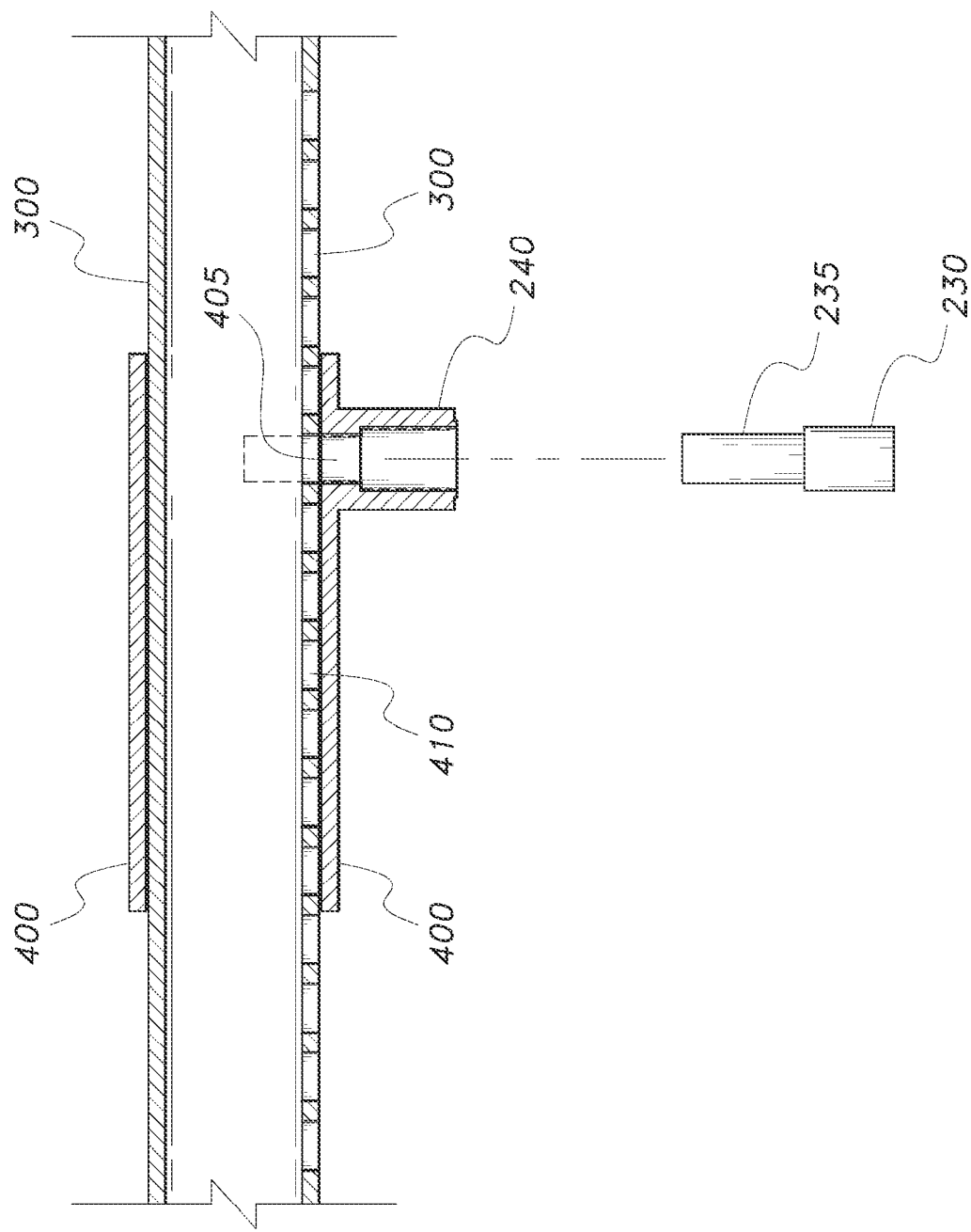
FIG. 11 shows a longitudinal section view according to the invention.
Figure 12:
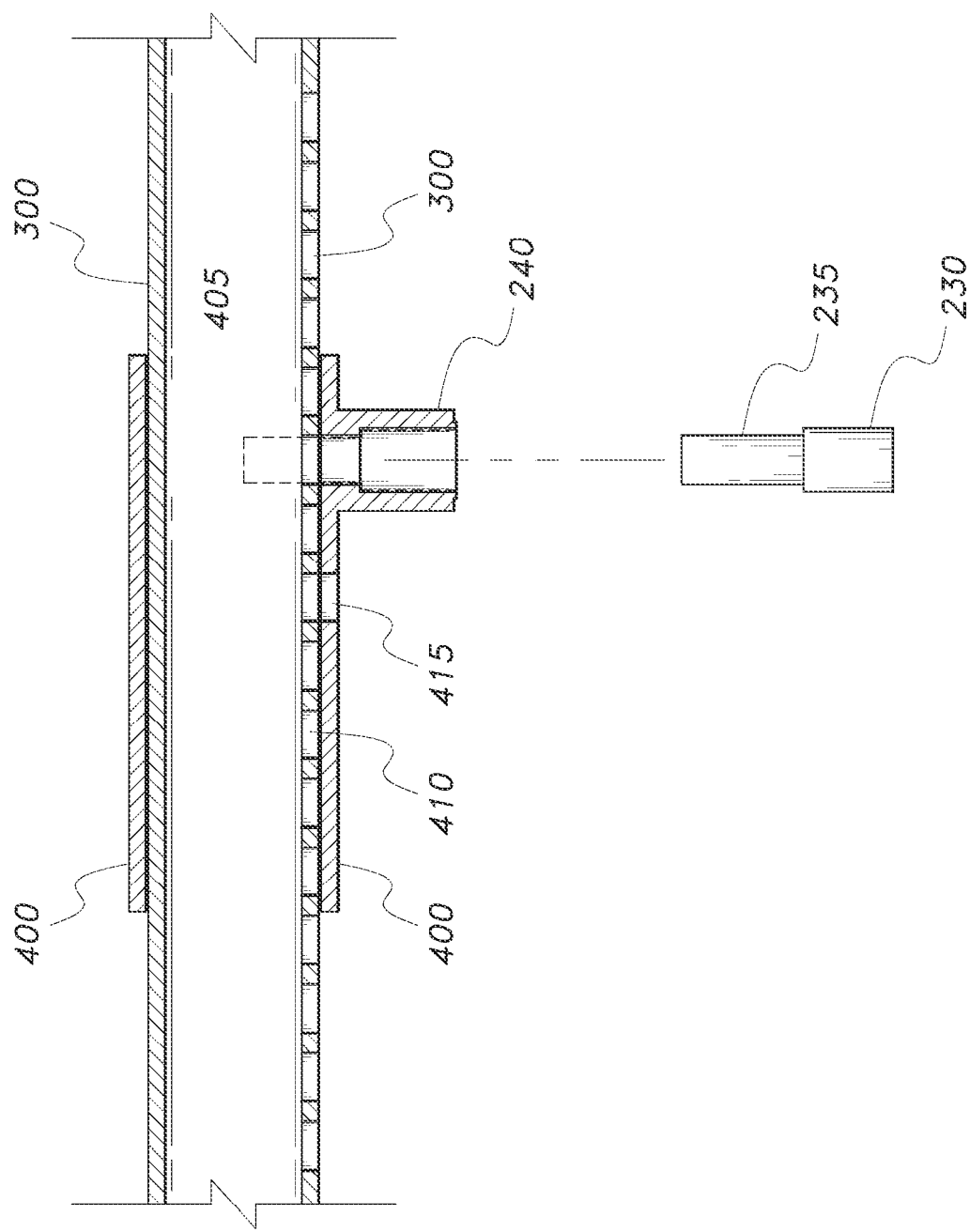
FIG. 12 shows a further longitudinal section view according to the invention.
Figure 13:
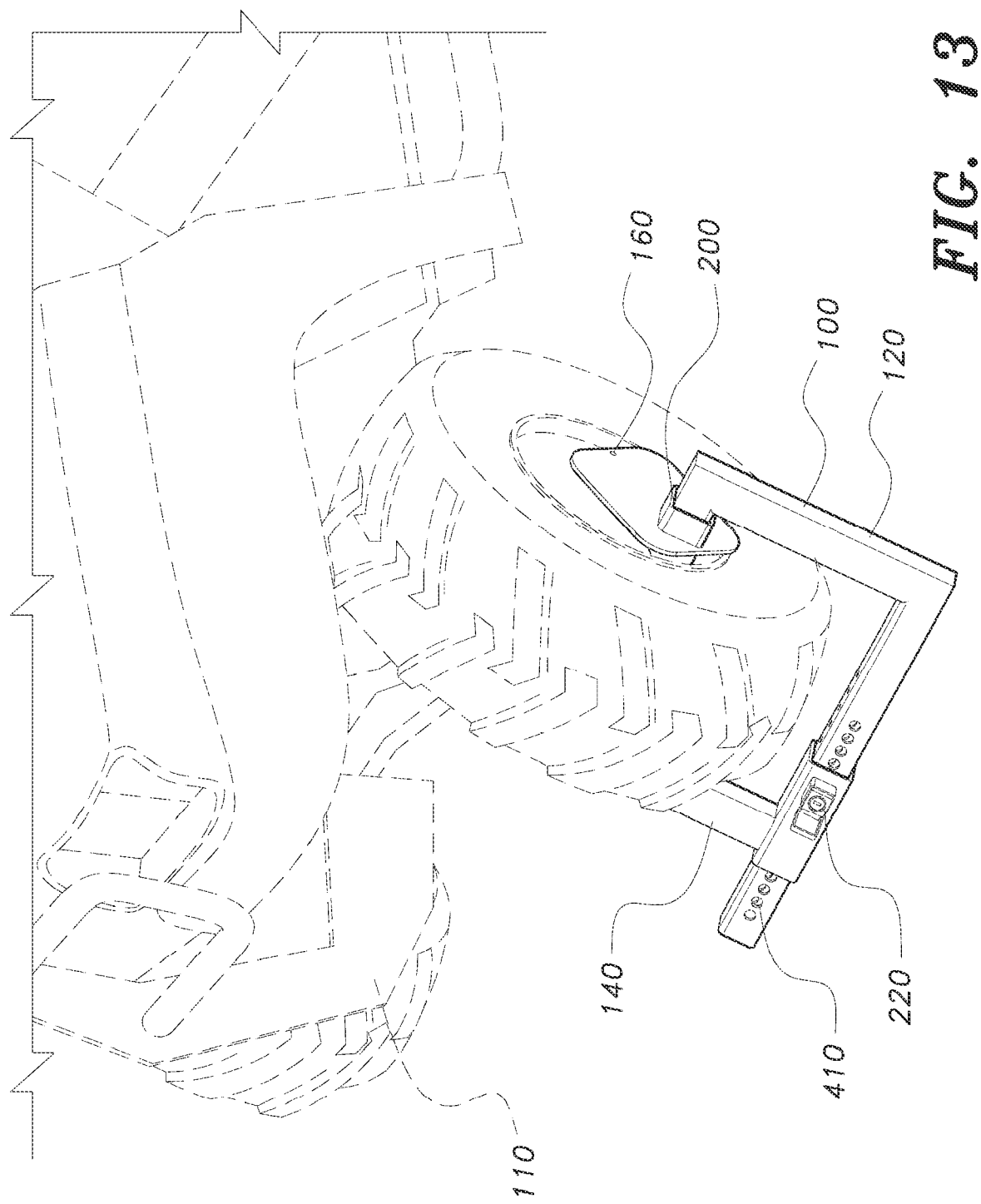
FIG. 13 shows a perspective environmental view of a wheel clamp according to the invention.
Figure 14:
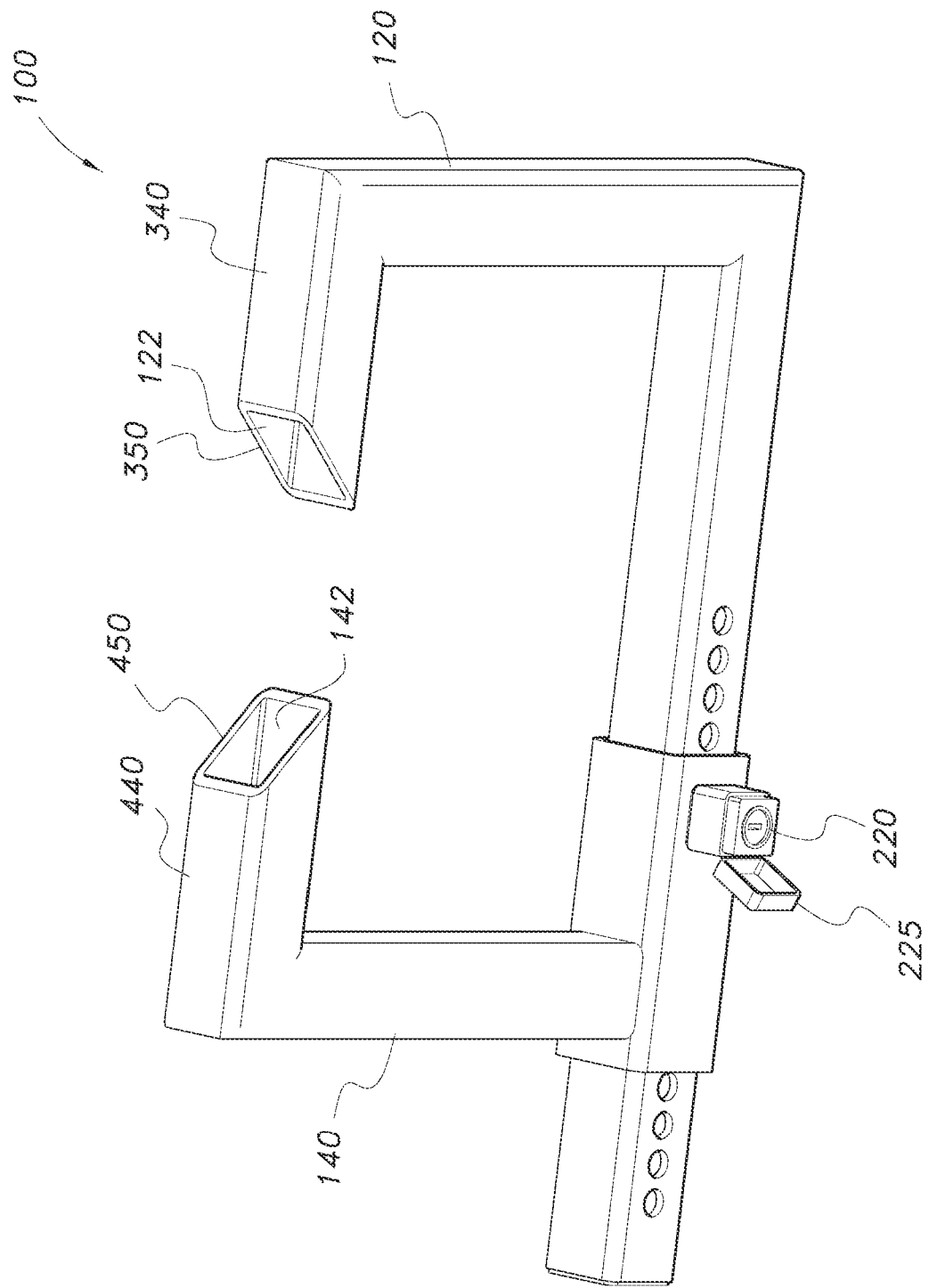
FIG. 14 shows a perspective front view of a wheel clamp according to the invention.

The first inner hook member 400 is perforated to provide an inner hole 405. (See, for example, FIG. 8B in which the lock mechanism 220 and housing 240 are shown removed for the purpose of revealing inner hole 405). The first outer hook member 300 is perforated to provide a plurality of outer holes 410. (See, for example, FIGS. 1, 3, 5, and 13). Wherein when the inner hole 405 is aligned with one of the plurality of outer holes 410 the lock mechanism 220 is capable of engaging the inner hole 405 (see FIGS. 8B and 11) with one of the plurality of outer holes 410 to prevent movement of the first outer hook member 300 relative to the first inner hook member 400 and thereby preventing movement of the outer hook 120 relative to the inner hook 140.

Figure 8C:
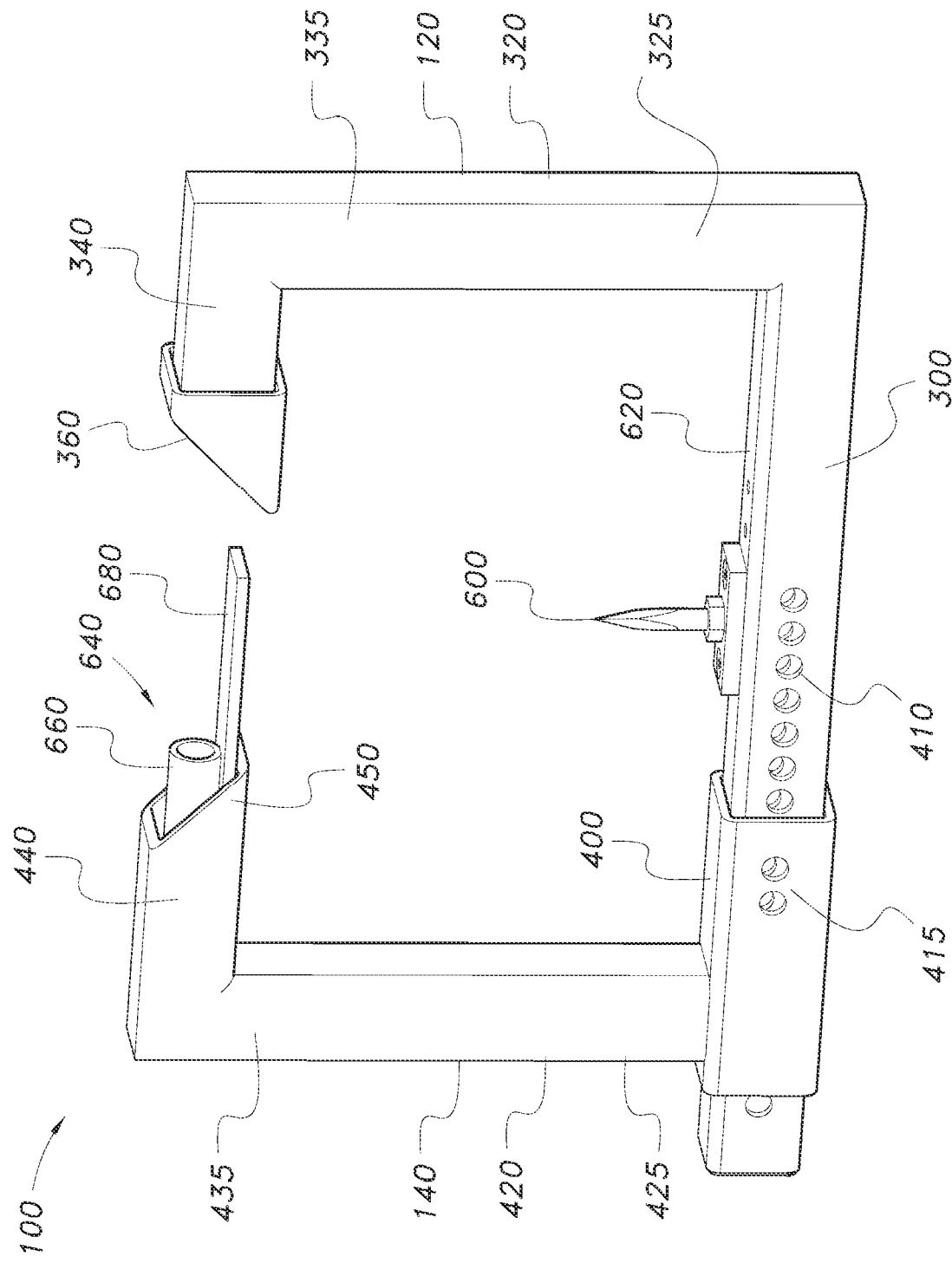

In one non-limiting embodiment, the first inner hook member 400 is further perforated to provide a plurality of inner holes 415. (See, for example, FIG. 8C in which the lock mechanism 220 and housing 240 are shown removed for the purpose of revealing the plurality of inner holes 415). Wherein when one of the inner holes 415 is aligned with one of the plurality of outer holes 410 the lock mechanism is capable of engaging at least one of the plurality of inner holes 415 with one of the plurality of outer holes 410 to prevent movement of the first outer hook member 300 relative to the first inner hook member 400 and thereby preventing movement of the outer hook 120 relative to the inner hook 140.

The lock mechanism 220 can be any suitable lock. In one non-limiting embodiment, the lock mechanism 220 is a barrel lock 230. (See, for example, FIGS. 3, 8A, 11, and 12).

Figure 2:
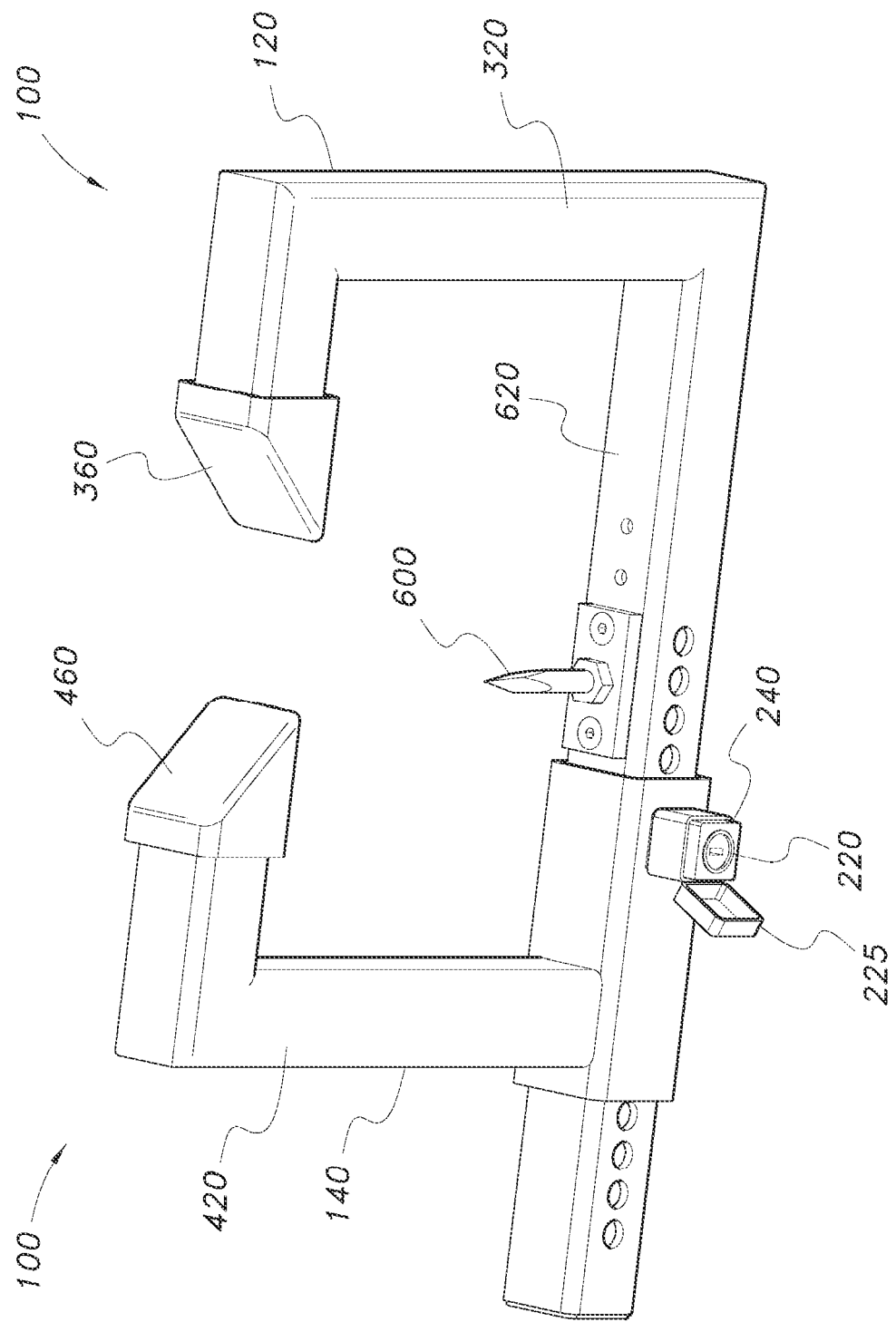
FIG. 2 shows a perspective front view of a wheel clamp according to the invention.

In one non-limiting embodiment, a 220 lock cap 225 covers at least a part of the lock mechanism 220 to keep out dust and unwanted detritus. (See, for example, FIGS. 2 and 3).

In one non-limiting embodiment, the wheel clamp 100 further comprises a nail like projection 600 extending from an inner side 620 of the first outer hook member 300. (See, for example, FIG. 8A). The purpose of the nail like projection 600 is to increase the possibility of causing a flat tire should someone interfere with the wheel clamp 100 thereby reducing the risk of theft or illicit use of the vehicle.

Figure 10:
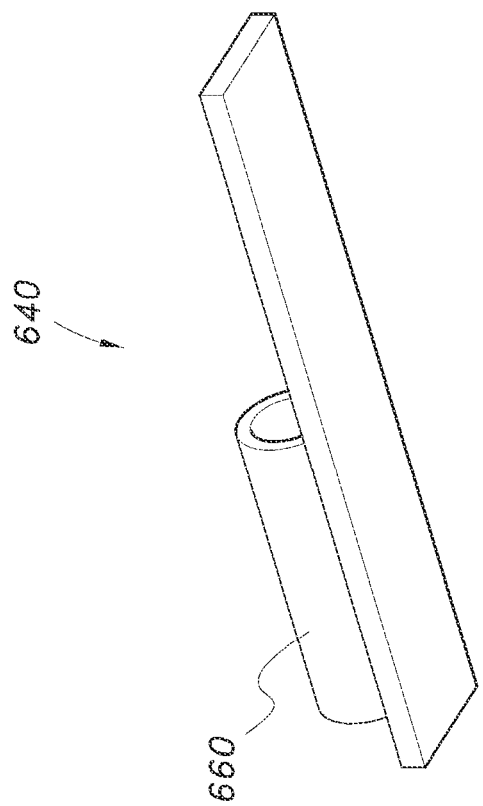
FIG. 10 shows a bottom view of the elongated extension member shown in FIG. 9.
Figure 9:
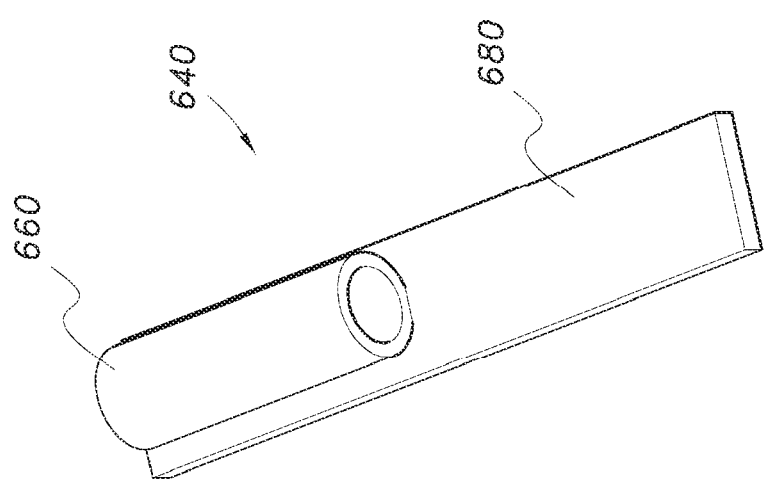
FIG. 9 shows a top view of an elongated extension member according to the invention.
Figure 18A:
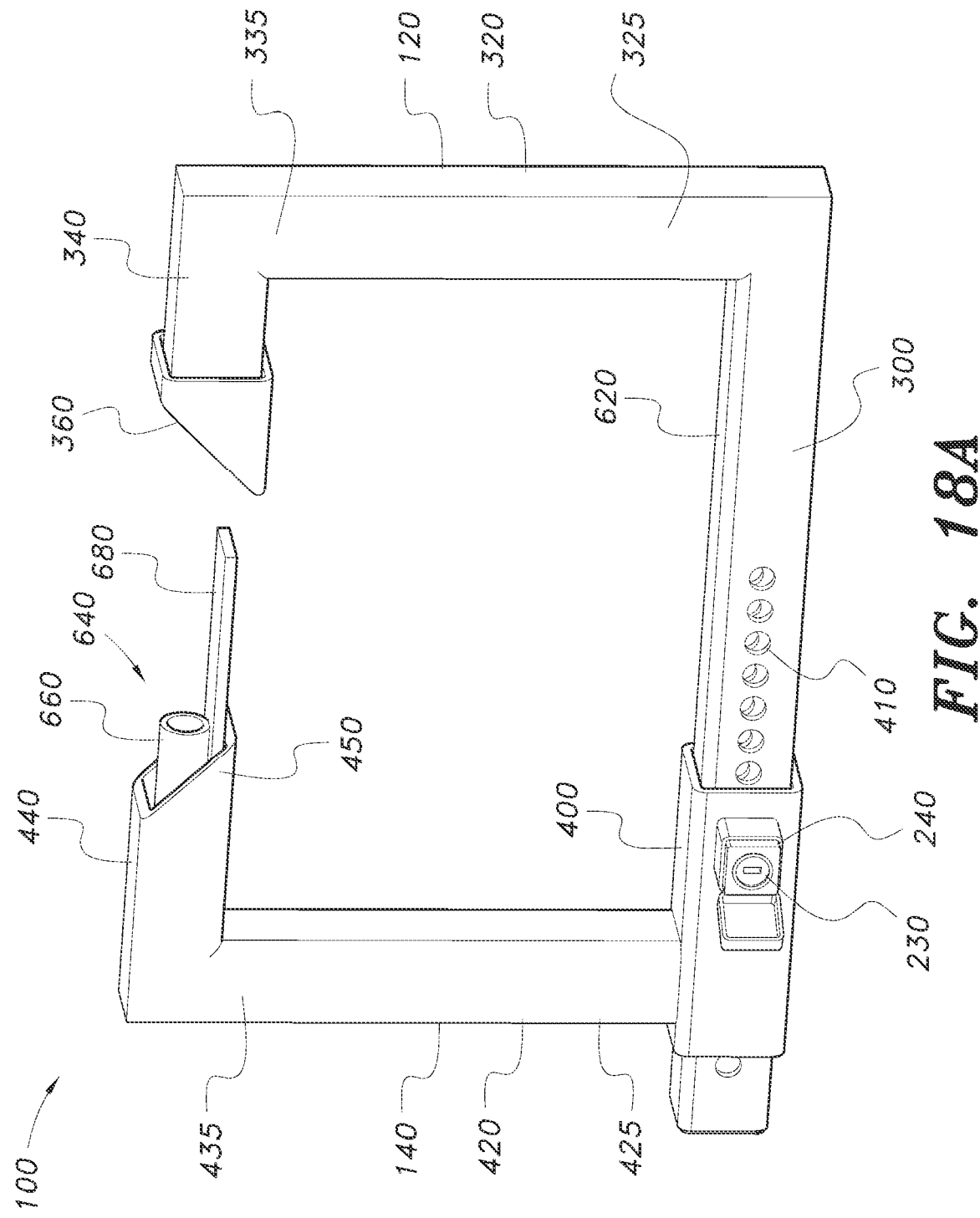
FIG. 18A shows a front view of a wheel clamp according to the invention.
Figure 18B:
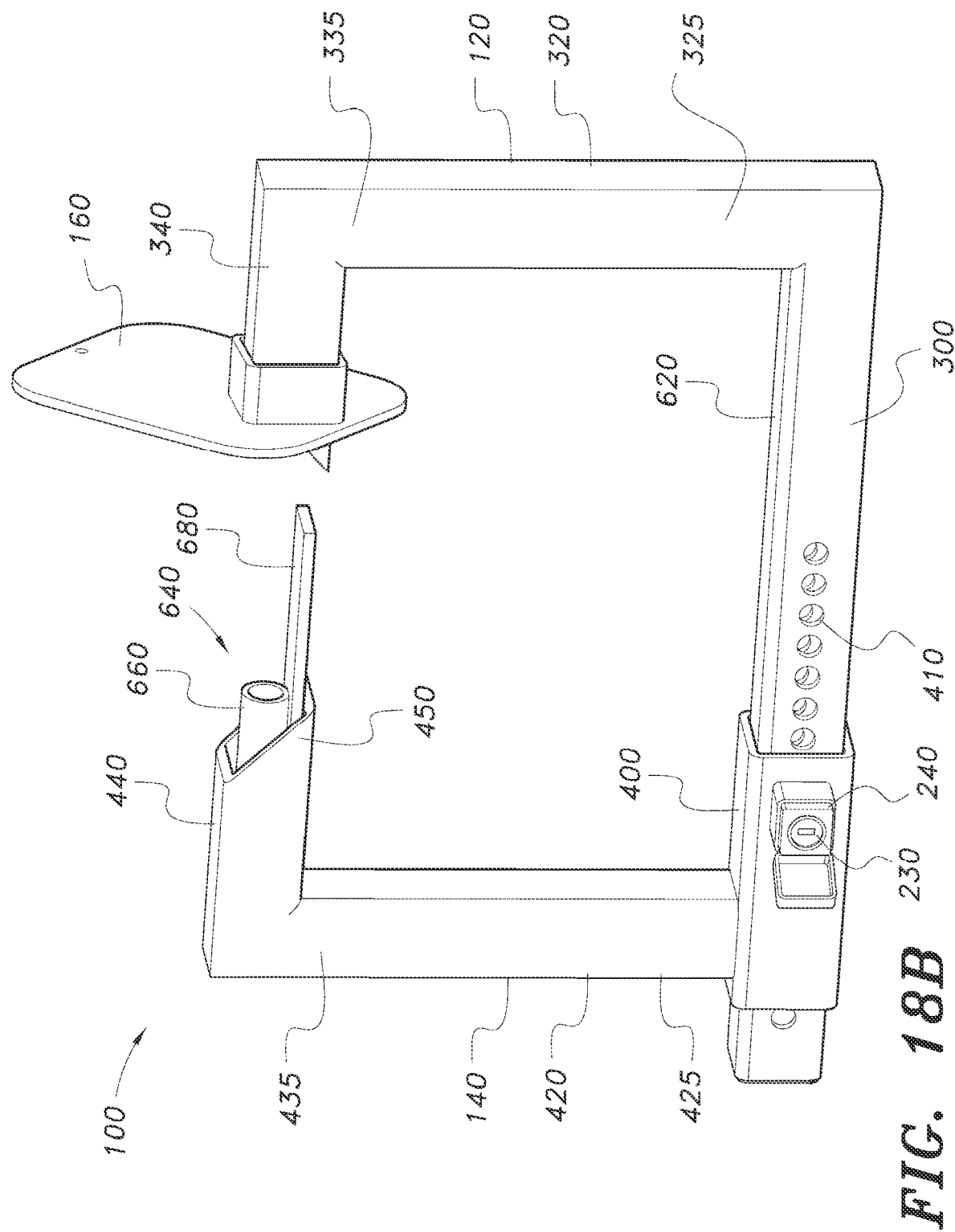
FIG. 18B shows a front view of a wheel clamp according to the invention.

In one non-limiting embodiment, the wheel clamp 100 further comprises an elongated extension member 640 that extends from the third inner hook member 440 (see, for example, FIGS. 8A and 18A); the elongated extension member 640 defines an upper side 680, a tubular member 660 is attached to the upper side 680, the tubular member 660 being parallel to the elongated extension member 640 (see, for example, FIGS. 9 and 10).

In one non-limiting embodiment, the outer hook 120 adopts a first generally rectangular u-shaped configuration, and the inner hook 140 adopts a second generally rectangular u-shaped configuration, wherein the outer hook and inner hook face each other.

Figure 15:
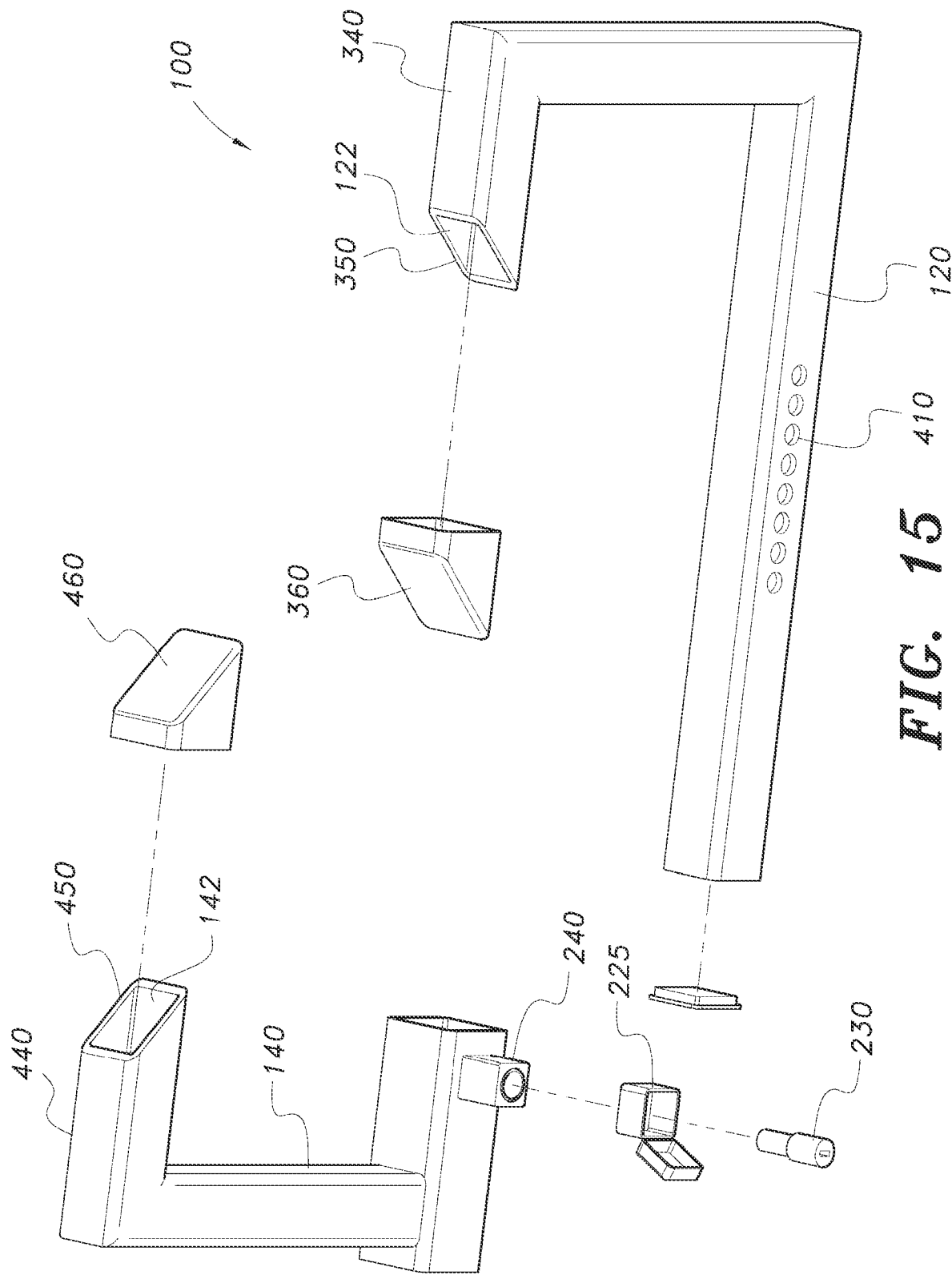
FIG. 15 shows an exploded view of a wheel clamp according to the invention.
Figure 16:
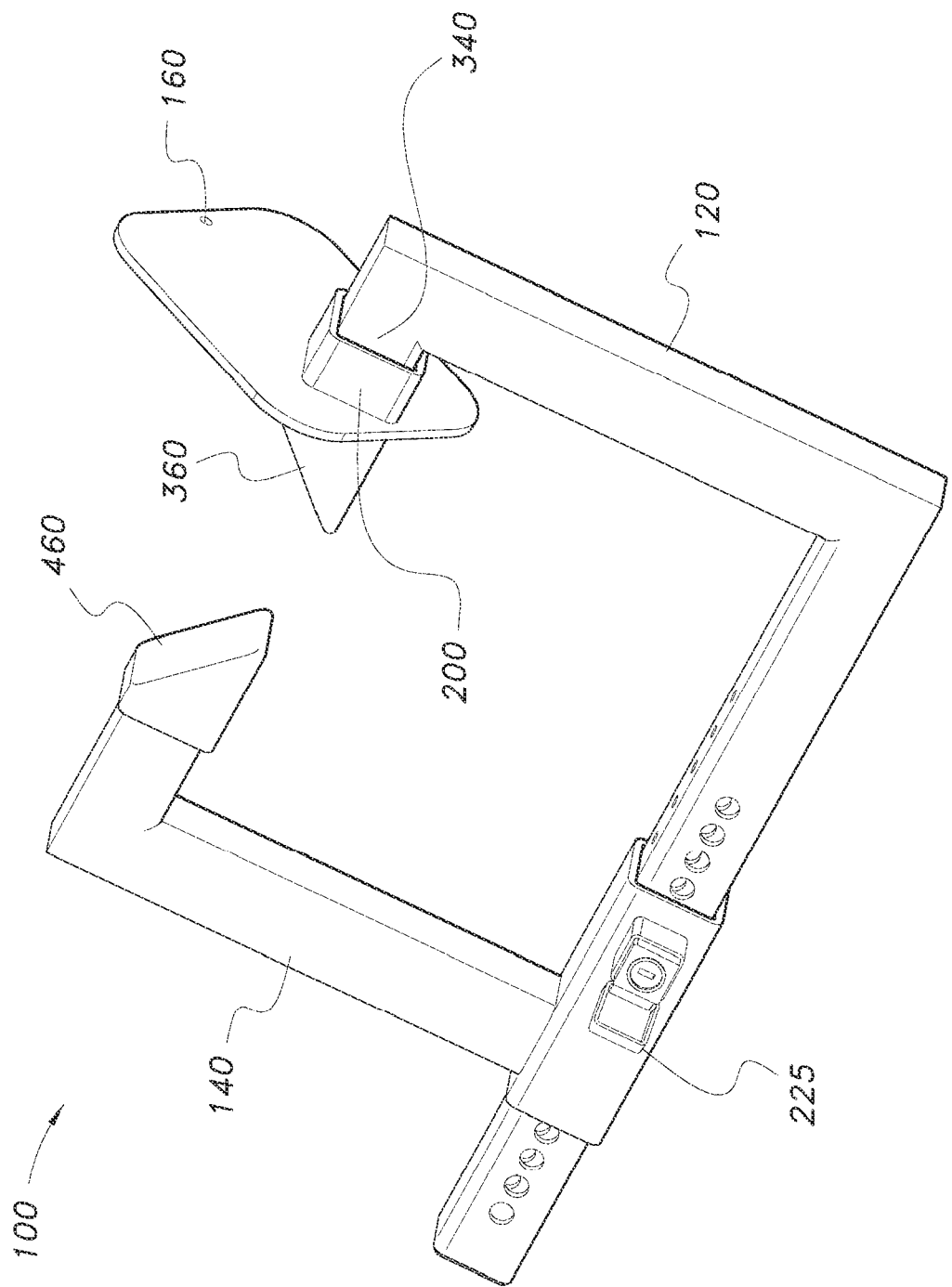
FIG. 16 shows a perspective front view of a wheel clamp according to the invention.

In one non-limiting embodiment, a first angular cap 360 fits over the angular shaped first end 350; and a second angular cap 460 fits over the angular shaped second end 450. (See, for example, FIGS. 3 and 15).

In one non-limiting embodiment, during normal operation of the wheel clamp 100 the female receiving member 200 receives the angular shaped first end 350 of the third outer hook member 340 whereupon a first angular cap 360 is fitted over the first end 350.

In one non-limiting embodiment, the outer hook 120 defines a first hollow square cross-section 122; and the inner hook 140 defines a second hollow square cross-section 142. (See, for example, FIGS. 3 and 15). The nature of the hollow cross-section of the outer hook 120 and inner hook 140 can vary and, for example, can take the form of a hollow rectangular cross-section.

In one non-limiting embodiment, the wheel clamp 100 comprises the plate member 160 as well as an elongated extension member 640 that extends from the third inner hook member 440; the elongated extension member 640 defines an upper side 680, a tubular member 660 is attached to the upper side 680, the tubular member 660 being parallel to the elongated extension member 640 (see, for example, FIG. 188).

Figure 18C:
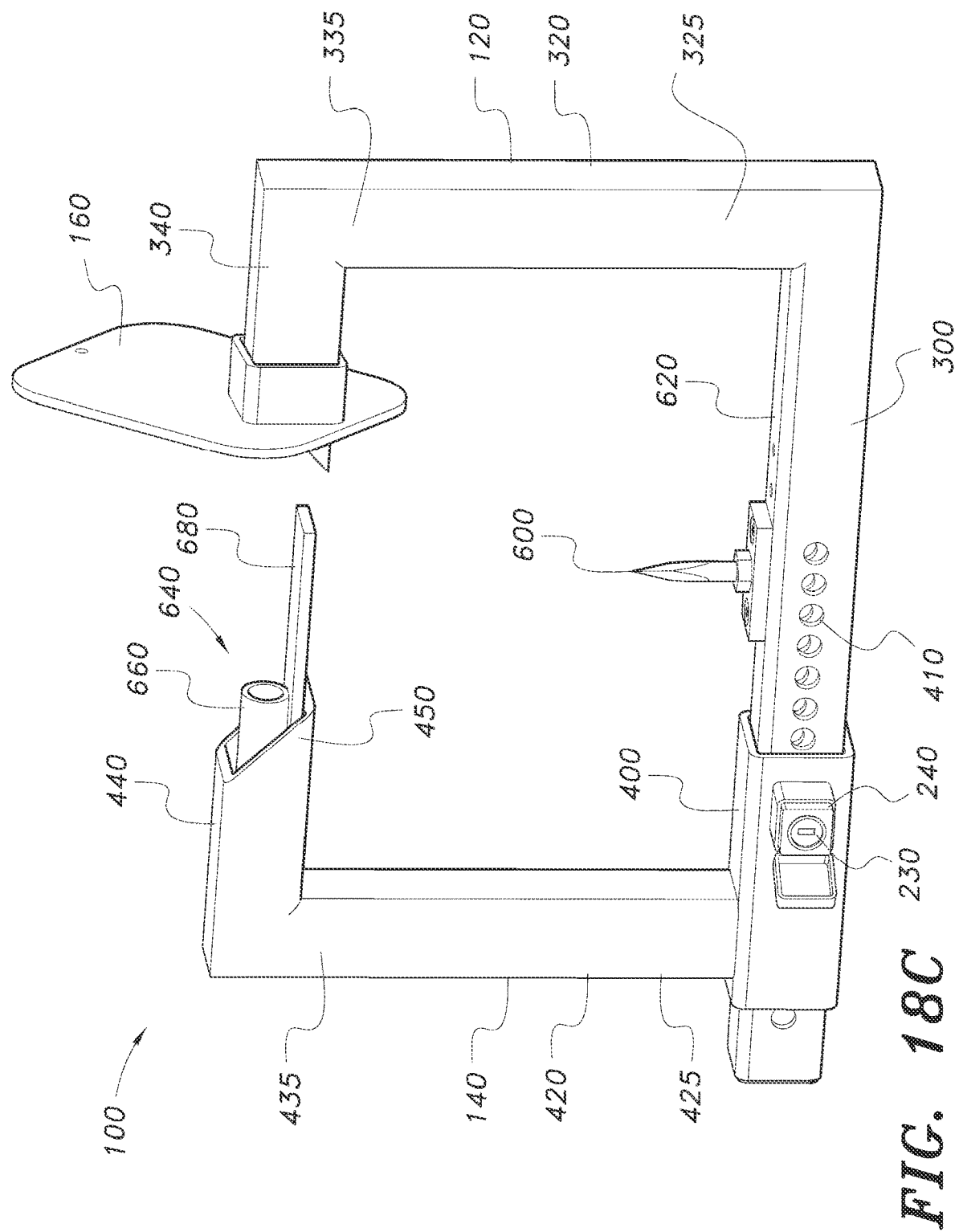
FIG. 18C shows a front view of a wheel clamp according to the invention.

In one non-limiting embodiment, the wheel clamp 100 comprises nail like projection 600, and the plate member 160 as well as an elongated extension member 640 that extends from the third inner hook member 440; the elongated extension member 640 defines an upper side 680, a tubular member 660 is attached to the upper side 680, the tubular member 660 being parallel to the elongated extension member 640 (see, for example, FIG. 18C).

In one non-limiting embodiment, the wheel clamp 100 lacks the plate member 160, i.e., the plate aperture 180 therethrough, and further lacks a female receiving member 200 as shown in FIGS. 19 and 20.

In one non-limiting embodiment, the wheel clamp 100 is made of steel.

In one non-limiting embodiment, the wheel clamp 100 is made of composite material.

In one non-limiting embodiment, the wheel clamp 100 is made of a combination of composite material and steel. For example, the amount of composite can vary between 5% and 95% the remaining being steel, and vice versa.

The composite material can take any suitable form such as, but not limited to, fiber-reinforced plastic.

Patents which explain how to make and mould fiber-reinforced plastics include, alone or in combination, as follows: U.S. Pat. No. 4,255,087 (to Wackerle, et al, "Member formed of fiber-reinforced plastic material, such as a rotor blade"), U.S. Pat. No. 4,188,032 (to Yanagiok, "Nickel-plated golf club shaft made of fiber-reinforced plastics"), U.S. Pat. No. 4,339,490 (to Yoshioka, et al, "Fiber reinforced plastic sheet molding compound"), U.S. Pat. No. 4,696,459 (to Woltron, et al. "Plastic leaf spring with at least one spring-eye body or spring-eye section"), U.S. Pat. No. 4,671,842 (to Prochaska, et al, "System for the manufacture of tubular structural parts of a fiber-reinforced plastic"), U.S. Pat. No. 4,234,190 (to Airhart, "Carbon fiber-reinforced plastic arrow"), U.S. Pat. No. 6,797,331 (to Singler, et al, "Process for producing a chemical-resistant protective layer for a rotary body having a base body made from fiber-reinforced plastic"), U.S. Pat. No. 5,665,470 (to Key, et al, "Glass fibers and fiber-reinforced plastics"), U.S. Pat. No. 5,601,493 (to Nakazono, et al, "Drive shaft made of fiber reinforced plastics, and method for connecting pipe made of fire-reinforced plastics"), U.S. Pat. No. 5,534,318 (to Andre De La Porte, et al, "Hollow fiber-reinforced plastic body"), U.S. Pat. No. 10,611,057 (to Taketa, et al), U.S. Pat. No. 9,751,239 (to Murai, et al, "Method and device for molding fiber-reinforced plastic member"), U.S. Pat. No. 9,574,081 (to Ishimoto, et al, "Epoxy-resin composition, and film, prepreg and fiber-reinforced plastic using the same"), U.S. Pat. No. 9,168,801 (to Dicke, et al, "Transverse link made of fibre-reinforced plastics material for a wheel suspension of a vehicle"), U.S. Pat. No. 7,083,199 (to Graber, et al, "Chassis part consisting of fiber-reinforced plastics, equipped with an integrated sensor"), U.S. Pat. No. 8,376,426 (to Choi, et al, "Plastic composite bumper beam for vehicle") U.S. Pat. No. 10,773,472 (to Takano, et al, "Method for manufacturing fiber-reinforced plastic molded body"), and U.S. Pat. No. 10,227,464 (to Saji, "Fiber-reinforced plastic shaped product").

Composite materials that can also be used in the present invention include those described in; U.S. Pat. No. 11,220,465 (to Kube, et al, "Method for producing SiC/SiC composite material"), U.S. Pat. No. 11,208,535 (to Ochi, et al, "Production method for prepreg, and production method for fiber-reinforced composite material"), U.S. Pat. No. 11,203,178 (to Kuroda, "Reinforced substrate for composite material, composite material, and method for manufacturing reinforced substrate for composite material"), U.S. Pat. No. 11,187,09 (to Ochi, et al, "Coating-liquid-impregnated fiber-reinforced fabric, sheet-shaped integrated object, prepreg, prepreg tape, and method for manufacturing fiber-reinforced composite material"), U.S. Pat. No. 11,208,911 (to Sadler, et al, "Turbine shroud ring segments with ceramic matrix composite components"), U.S. Pat. No. 11,198,651 (to Sadler, et al, "Turbine shroud ring segments with ceramic matrix composite components")"); and U.S. Pat. No. 11,198,924 (to Chandrasekaran, et al, "Composite materials").

It is to be understood that the present invention is not limited to the embodiments described above, but encompasses any and all embodiments within the scope of the following claims.

What is claimed:
1. A wheel clamp, comprising:
   an outer hook;
   an inner hook;
   a plate member having a plate aperture therethrough, wherein a female receiving member both surrounds and extends from the plate aperture;
   wherein the outer hook comprises a first outer hook member, a second outer hook member, and a third outer hook member,
   wherein the female receiving member receives a first end of the third outer hook member,
   wherein the inner hook comprises a first inner hook member, a second inner hook member, and a third inner hook member,
   a lock mechanism, wherein the lock mechanism is at least partly surrounded by a housing, wherein the lock mechanism and housing form part of the first inner hook member,
   wherein an elongated extension member extends from the third inner hook member, wherein the extension member is located directly opposite the plate member,
   wherein the elongated extension member defines an upper side, wherein a tubular member is attached to the upper side,
   wherein the first inner hook member is perforated to provide an inner hole, the first outer hook member is perforated to provide a plurality of outer holes, wherein when the inner hole is aligned with one of the plurality of the outer holes the lock mechanism is capable of engaging the inner hole with one of the plurality of outer holes to prevent movement of the first outer hook member relative to the first inner hook member and thereby preventing movement of the outer hook relative to the inner hook.

2. The wheel clamp according to claim 1, further comprises a nail like projection extending from an inner side of the first outer hook member.

3. The wheel clamp according to claim 1, wherein the tubular member is parallel to the elongated extension member.

4. The wheel clamp according to claim 1, wherein the first end defines an angular shape.

5. The wheel clamp according to claim 1, wherein the wheel clamp is made of composite material.

6. The wheel clamp according to claim 1, wherein the wheel clamp is made of steel.

7. The wheel clamp according to claim 2, wherein the wheel clamp is made of a combination of composite material and steel.

8. The wheel clamp according to claim 1, wherein the outer hook adopts a first generally rectangular u-shaped configuration and the inner hook adopts a second generally rectangular u-shaped configuration, wherein the outer hook and inner hook face each other.

9. A wheel clamp, comprising:
   an outer hook, the outer hook comprises a first outer hook member, a second outer hook member and a third outer hook member, wherein the second outer hook member is located between the first outer hook member and the third outer hook member, the first outer hook member is connected to a bottom end of the second outer hook member, the third outer hook member being connected to a top end of the second outer hook member;
   an inner hook, wherein the inner hook comprises a first inner hook member, a second inner hook member, and a third inner hook member, wherein the outer hook adopts a first generally rectangular u-shaped configuration, and the inner hook adopts a second generally rectangular u-shaped configuration, wherein the outer hook and inner hook face each other;

a plate member having a plate aperture therethrough, wherein a female receiving member both surrounds and extends from the plate aperture, wherein the female receiving member receives a first end of the third outer hook member; and a lock mechanism, wherein the lock mechanism is at least partly surrounded by a housing, wherein the lock mechanism and housing form part of the first inner hook member, wherein an elongated extension member extends from the third inner hook member, wherein the extension member is located directly opposite the plate member, the elongated extension member defines an upper side, a tubular member is attached to the upper side, the tubular member being parallel to the elongated extension member, wherein the first inner hook member is perforated to provide an inner hole, the first outer hook member is perforated to provide a plurality of outer holes, wherein when the inner hole is aligned with one of the plurality of outer holes the lock mechanism is capable of engaging the inner hole with one of the plurality of outer holes to prevent movement of the first outer hook member relative to the first inner hook member and thereby preventing movement of the outer hook relative to the inner hook.

10. The wheel clamp according to claim 9, wherein the lock mechanism is a barrel lock.

11. The wheel clamp according to claim 9, further comprises a nail like projection extending from an inner side of the first outer hook member.

12. The wheel clamp according to claim 9, wherein the wheel clamp is made of composite material.

13. The wheel clamp according to claim 9, wherein the wheel clamp is made of steel.

14. The wheel clamp according to claim 9, wherein the wheel clamp is made of a combination of composite material and steel.

15. A wheel clamp, comprising:
an outer hook;
an inner hook;
a plate member having a plate aperture therethrough, wherein a female receiving member both surrounds and extends from the plate aperture;
wherein the outer hook comprises a first outer hook member, a second outer hook member, and a third outer hook member,
wherein the female receiving member receives a first end of the third outer hook member,
wherein the inner hook comprises a first inner hook member, a second inner hook member, and a third inner hook member,
a lock mechanism, wherein the lock mechanism is at least partly surrounded by a housing, wherein the lock mechanism and housing form part of the first inner hook member, wherein the lock mechanism is a barrel lock,
wherein an elongated extension member extends from the third inner hook member,
wherein an elongated extension member extends from the third inner hook member, wherein the extension member is located directly opposite the plate member,
wherein the elongated extension member defines an upper side, wherein a tubular member is attached to the upper side,
wherein the first inner hook member is perforated to provide an inner hole, the first outer hook member is perforated to provide a plurality of outer holes, wherein when the inner hole is aligned with one of the plurality of the outer holes the barrel lock is capable of engaging the inner hole with one of the plurality of outer holes to prevent movement of the first outer hook member relative to the first inner hook member and thereby preventing movement of the outer hook relative to the inner hook.

* * * * *